Feb. 14, 1956 M. GREEN 2,734,639
GARMENT SUPPORTING BRACKET FOR AUTOMOBILE USE
Filed April 1, 1953
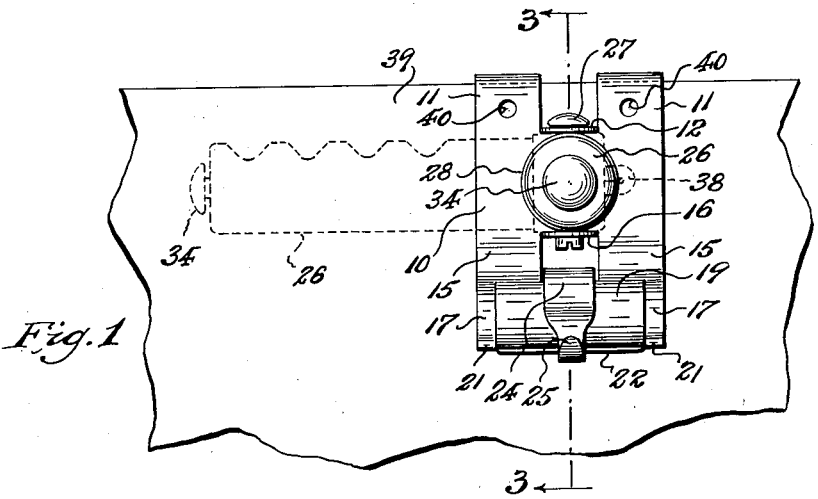
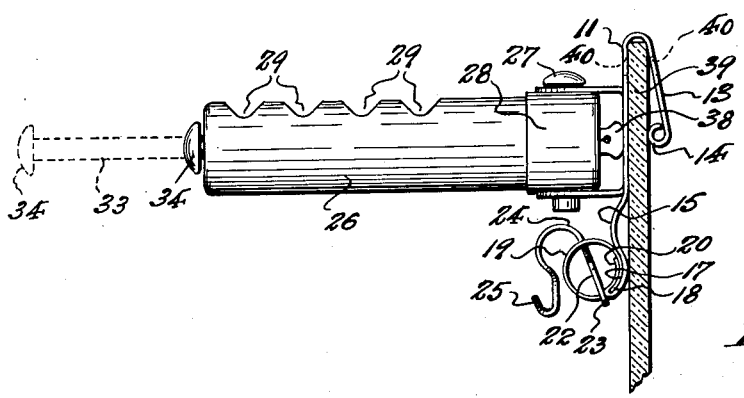
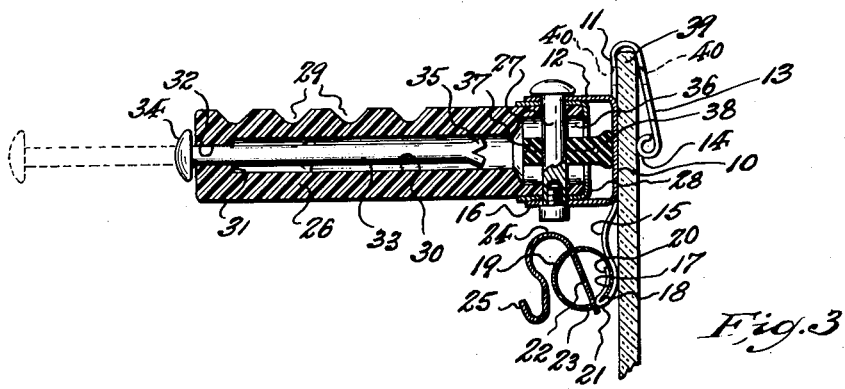
INVENTOR.
Martin Green,
BY George D. Richards
Attorney

2,734,639
GARMENT SUPPORTING BRACKET FOR AUTOMOBILE USE

Martin Green, Mawah, N. J.

Application April 1, 1953, Serial No. 346,136

1 Claim. (Cl. 211—96)

This invention relates to means of hanging garments; and has reference, more particularly, to a supporting bracket adapted for use in various locations, but especially adapted for use in automobiles.

When traveling in automobile passenger cars, it is frequently desirable to hang either garments doffed by the passengers, or extra garments taken along for future use, within the automobile interior, so that said garments will not require to be packed or folded with risk of wrinkling or mussing, and so that the garments can be both supported without risk of wrinkling or mussing, and also so disposed as to be readily and quickly accessible and available for use.

Having the above in view, it is an object of this invention to provide a novel construction of supporting bracket device which is adapted to be detachably mounted within the interior of an automobile, e. g. as by attachment to a partially lowered window, so that, when so mounted, garments can be hung therefrom in removable suspended condition free from wrinkles, and yet readily available for use when need therefor arises.

The invention has for another object to provide a supporting bracket device for the above stated purposes which includes a plurality of means respectively adapted for the support of garments of respectively different characteristics; such e. g. as means for suspending coats, sweaters or the like, and other means for suspending a hat or other article.

The invention has for a further object to provide a novel supporting bracket device having a foldable bar adapted to be turned or swung to project perpendicularly outward from a surface relative to which it is mounted, and thus to a position for use, or, optimally, to be folded back parallel to said surface, and thus out of the way when use thereof is not required; means being provided for frictionally retaining said bar against accidental displacement from a projected position for use.

The above and other objects will be understood from a reading of the following detailed description of an illustrative embodiment of the invention in connection with the accompanying drawings, in which:

Fig. 1 is a front elevational view of the supporting bracket device according to this invention as detachably mounted upon a partially lowered window of an automobile, the foldable bar being shown by full lines in position for use, and by broken lines in folded back out of use position; Fig. 2 is a side elevational view of the supporting bracket device, the automobile window upon which it is mounted being shown in section; and Fig. 3 is a longitudinal sectional view, taken on line 3—3 in Fig. 1.

Similar characters of reference are employed in the herein above described views, to indicate corresponding parts.

Referring to the drawings, the illustrative embodiment of the invention therein shown comprises a base plate 10, which is preferably formed from sheet metal. The upper end portion of the base plate 10 is divided longitudinally to provide upward extensions 11 and an intermediate upper bearing ear 12, the latter being bent to project outwardly from the front face of said base plate at a right angle thereto. The free end portions of said extensions 11 are doubled back upon themselves to form inverted hook elements 13 disposed in opposition to the rear face of said base plate; said hook elements preferably terminating in inwardly directed nosing formations 14. Similarly, the lower portion of the base plate 10 is also divided longitudinally to provide downward extensions 15 and an intermediate lower perforate bearing ear 16 which is bent to project outwardly from the front face of said base plate at a right angle thereto, and so as to be aligned with and vertically spaced relative to said upper bearing ear 12.

Means is provided in connection with the downward extensions 15 of the base plate whereby, in cooperation therewith, to form a manipulatable spring closed clasp of the opposed jaw type. In one arrangement for this purpose, as shown, the downward extensions 15 of the base plate are shaped to provide concave seats 17 to support, in transverse disposition across the same, the inner marginal portions 18 of a longitudinally split cylindrical spring member 19. Terminal portions 20 of the downward extensions 15 are doubled back upon themselves around and over said inner marginal portions 18 of the split cylindrical spring member, whereby to fix the latter in place, and to form the stationary jaw 21 of the clasp. Extending diametrically through the split cylindrical spring member 19 is a jaw plate 22 against which the outer marginal portion 23 of the split cylindrical spring member tensionally bears, so as to be yieldably thrust against and in closed relation to the stationary jaw 21; said jaw plate 22 thus constituting the movable jaw of the clasp. The jaw plate 22 is provided, intermediate its ends and in upward extension therefrom, with a member 24 of reduced width which projects outwardly through a slot with which the body of the split cylindrical spring member 19 is provided, whereby said member 24 forms a finger piece by means of which the clasp can be manipulated. The free end portion of said finger piece member 24 is bent downwardly and terminates in a dependent hook element 25.

The reference character 26 indicates a bar from which, in use, garment hangers, with garments supported thereby, may be suspended. The rear end portion of this bar 26 is disposed between the upper and lower bearing ears 12 and 16 of the base plate 10, and is pivotally connected with said bearing ears by a vertical pivot pin 27 which is supported by and between the latter. As so pivotally mounted in connection with the base plate 10, the bar 26 may be swung in horizontal plane to outwardly projecting extension perpendicular to the plane of the base plate, and thus to a position for use (as shown by full lines in Figs. 1, 2 and 3), or said bar may be folded back parallel to the plane of the base plate 10, and thus out of the way, when use thereof is not required (as shown by broken lines in Fig. 1). The bar 26 may be made of any suitable rigid material, being shown as produced from a suitable plastic material. Preferably, but not necessarily, the rear end portion of said bar is capped by a metallic ferrule 28 through which the pivot pin 27 passes, thus providing a wear resistant pivotal connection. Said bar is provided in its external top surface with longitudinally spaced indentations or notches 29, which serve to seat garment hangers in spaced apart suspension from said bar, when garment hangers, with garments thereon, are applied to the bar.

Entering through the bar 26 from its rear end is an axial bore 30, which bore terminates short of the free outer end of the bar so as to provide an internal stop shoulder 31. Leading outwardly from the bore 30, through the free end portion of the bar 26, is an opening 32. Slidably extending through said opening 32, and into the bore 30, is an extension bar 33 having an enlarged head 34 at its outer end, and means at its inner end to provide a stop member 35, the latter, by abutment against the internal stop shoulder 31, serving to limit outward movement of the extension bar to its operative projected position, when use of said extension bar is desired. When the extension bar 33 is outdrawn to its operative projected position, it may also be used to support suspended garment hangers with garments thereon, thus increasing the carrying capacity of the bar structure when desired. When use of the extension bar 33 is not required, it is slid inwardly into the interior of the bar 26 (as shown by full lines in Fig. 3).

The bar 26 is provided with means for releasably retaining the same against accidental displacement from its operative outwardly projected relation to the base plate 10. In a preferred form of means for this purpose, as shown, the rearward end portion of the bar 26 is counterbored to provide a diametrically enlarged chamber 36. Housed within said chamber 36, to project rearwardly outward therefrom, is a friction stop member 37, which is made of elastically compressible material, such as soft rubber. The pivot pin 27 passes through the inner body portion of this friction stop member 37, thereby fixing the same in connection with the rear end of the bar 26, so as to anchor same against displacement. The rearwardly and outwardly projecting end portion 38 of the friction stop member normally extends a distance beyond the rear extremity of the bar 26 which is in excess of the distance at which said rear extremity of the bar 26 is spaced away from the base plate 10, when said bar is outswung to its operative projected, perpendicular relation to said base plate 10. As a consequence of this, when the bar 26 is outswung to said operative position thereof, the end portion 38 of the friction stop member will engage the face of the base plate 10, and will be yieldably compressed, whereby the same will make such strong frictional contact with the base surface that accidental displacement of the bar from its operative position will be strongly resisted. When, however, the bar 26 is manually swung to its infolded, out of use position, the friction stop member will readily yield to such movement, so as not to impede this movement.

The garment supporting bracket of this invention is especially adapted for removable attachment to a window 39 of an automobile. To this end, the automobile window 39 is lowered sufficiently to accessibly expose its top edge, whereupon the inverted hook elements 13 of the base plate 10 are hooked over the exposed top edge of said window, whereby to attach the bracket device in supported relation to the window, with its base plate 10 contiguously overlying the inner surface of the same. The bracket device being so attached to the window, the bar 26 is outswung to its operative position, perpendicular to the base plate 10, thus being disposed for application thereto of garment hangers, with garments hung thereon, or additionally to the extension bar 33 of said bar 26, whereby to suspend the garments therefrom. In addition to this, other articles, such as a hat, gloves or other articles of wear, may be detachably supported by gripping the same between the jaws 21 and 22 of the spring clasp structure of the device. The hook element 25 may also be utilized as a means for suspending other types of articles such e. g. as a hand bag.

It will now be obvious that the bracket device of this invention provides a very practical and convenient means for suspending articles of clothing and various other articles for carriage in an automobile, so that not only are the same readily accessible at all times, but are also so carried as to be free from risk of wrinkling or mussing.

When use of the bracket device is not required, the bar 26 may be folded back out of the way, or the bracket device can be easily removed from the automobile window, and stored away, as e. g. in the glove box of the automobile.

Although the bracket device of this invention is especially designed for service in an automobile in the manner above described, it can also be used in a closet or other permanent location. To the latter end, the upward extensions 11 of the base plate 10 and their inverted hook elements 13 are provided with aligned openings 40, through which fastening means, such as screws, can be passed to attach the device to a supporting wall or other surface.

Having now described my invention, I claim:

In a device of the kind described, a base plate having means to mount the same in a place of use and vertically spaced bearing ears outwardly projecting from its ends, a bar adapted to detachably support articles or material for suspension therefrom, said bar having a rearwardly endwise open socket at its rear end portion, an elastically compressible friction element disposed in said socket for axial external projection from its rearwardly open end, and a pivot pin supported by the bearing ears of the base plate for extension through said socket of the bar and the friction element therein, whereby to pivotally connect said bar and friction element to the base plate for optional outswinging movement to a service position perpendicular to said base plate or infolded movement to an out of service position parallel to said base plate, the exteriorly projecting end of said friction element being adapted to abut and be compressively engaged by said base plate in the out swung position of the bar, whereby to yieldably retain the latter against accidental displacement from its out swung service position when disposed therein.

References Cited in the file of this patent

UNITED STATES PATENTS

| | | |
|---|---|---|
| 387,340 | Conover | Aug. 7, 1888 |
| 463,786 | Davidson | Nov. 24, 1891 |
| 844,514 | Gillmore | Feb. 19, 1907 |
| 1,236,169 | Hentnik | Aug. 7, 1917 |
| 1,491,286 | Calhoun | Apr. 22, 1924 |
| 1,716,194 | Solski | June 4, 1929 |
| 1,726,316 | Saxton | Aug. 27, 1929 |
| 1,796,344 | Pleiss | Mar. 17, 1931 |
| 1,843,207 | Collier | Feb. 2, 1932 |
| 2,344,339 | Zwald | Mar. 14, 1944 |